United States Patent
Yang et al.

(10) Patent No.: US 11,410,412 B2
(45) Date of Patent: Aug. 9, 2022

(54) ANTI-COUNTERFEITING METHOD AND SYSTEM FOR UNDER-SCREEN FINGERPRINT IDENTIFICATION

(71) Applicant: Egis Technology Inc., Taipei (TW)

(72) Inventors: Chen Yang, Taipei (TW); Kuan-Yi Lin, Taipei (TW); Chia-Wei Lin, Taipei (TW); Yu-Hua Lin, Taipei (TW)

(73) Assignee: Egis Technology Inc., Hsinchu (TW)

( * ) Notice: Subject to any disclaimer, the term of this patent is extended or adjusted under 35 U.S.C. 154(b) by 12 days.

(21) Appl. No.: 17/100,956

(22) Filed: Nov. 23, 2020

(65) Prior Publication Data

US 2021/0224514 A1  Jul. 22, 2021

Related U.S. Application Data

(60) Provisional application No. 62/963,546, filed on Jan. 21, 2020, provisional application No. 63/027,964, filed on May 21, 2020.

(30) Foreign Application Priority Data

Oct. 16, 2020  (CN) .......................... 202011109804.7

(51) Int. Cl.
*G06V 10/56* (2022.01)
*G06V 10/60* (2022.01)
*G06V 10/147* (2022.01)
*G06V 40/13* (2022.01)
*G06V 40/40* (2022.01)
(Continued)

(52) U.S. Cl.
CPC ............ *G06V 10/56* (2022.01); *G06V 10/147* (2022.01); *G06V 10/16* (2022.01); *G06V 10/60* (2022.01); *G06V 40/13* (2022.01); *G06V 40/1318* (2022.01); *G06V 40/1353* (2022.01);
(Continued)

(58) Field of Classification Search
CPC ...... G06V 10/56; G06V 10/147; G06V 10/60; G06V 40/13; G06V 40/1318; G06V 40/1353; G06V 40/1365; G06V 40/1388; G06V 40/45; G06V 40/1382
See application file for complete search history.

(56) References Cited

U.S. PATENT DOCUMENTS

| 9,111,126 B2 | 8/2015 | Carper |
| 2017/0220838 A1* | 8/2017 | He .......................... G06F 3/044 |

(Continued)

FOREIGN PATENT DOCUMENTS

| CN | 106815564 | 6/2017 |
| CN | 107004130 | 8/2017 |

(Continued)

*Primary Examiner* — Edward F Urban
*Assistant Examiner* — Wassim Mahrouka
(74) *Attorney, Agent, or Firm* — JCIPRNET (57) ABSTRACT

An anti-counterfeiting method and a system for under-screen fingerprint identification are provided. A fingerprint sensing apparatus includes a display device and a fingerprint sensor, and the method includes the following steps. A fingerprint sensing image is captured for an object on the display device through the fingerprint sensor. The fingerprint sensing image is calibrated by using a color calibration parameter to generate a calibrated image. Whether the object is a real finger is determined by using an anti-counterfeiting algorithm and the calibrated image.

12 Claims, 4 Drawing Sheets

(51) Int. Cl.
 *G06V 40/12* (2022.01)
 *G06V 10/10* (2022.01)
(52) U.S. Cl.
 CPC ...... *G06V 40/1365* (2022.01); *G06V 40/1388* (2022.01); *G06V 40/45* (2022.01)

(56) References Cited

U.S. PATENT DOCUMENTS

2018/0107858 A1* 4/2018 Chen ................ H04N 1/6005
2021/0064899 A1* 3/2021 Lee ................ G06V 40/1347

FOREIGN PATENT DOCUMENTS

| | | | |
|---|---|---|---|
| CN | 104463074 | | 10/2017 |
| CN | 110337656 A | * | 10/2019 |
| CN | 110582780 | | 12/2019 |
| FR | 3102324 A1 | * 4/2021 | ......... G06K 9/00906 |
| TW | 201101196 | | 1/2011 |
| TW | I525317 | | 3/2016 |

* cited by examiner

ANTI-COUNTERFEITING METHOD AND SYSTEM FOR UNDER-SCREEN FINGERPRINT IDENTIFICATION

CROSS-REFERENCE TO RELATED APPLICATION

This application claims the priority benefit of U.S. provisional application No. 62/963,546, filed on Jan. 21, 2020, U.S. provisional application No. 63/027,964, filed on May 21, 2020, and China application no. 202011109804.7, filed on Oct. 16, 2020. The entirety of each of the above-mentioned patent applications is hereby incorporated by reference herein and made a part of this specification.

BACKGROUND

1. Technical Field

The disclosure relates to a fingerprint identification technology, and particularly relates to an anti-counterfeiting method and system for under-screen fingerprint identification.

2. Description of Related Art

In recent years, fingerprint identification technology has been widely used in a variety of electronic devices to provide identity authentication. At present, fingerprint on display (FOD) sensing solutions have been developed as handheld electronic devices move towards full screen. In the optical under-screen fingerprint sensing solution, the optical sensor is positioned below the display panel and a light source of the display panel illuminates the finger. Therefore, the user can touch or press his finger against the display panel, such that the optical sensor senses the image light reflected by the finger, so as to obtain a fingerprint image. However, when a fake finger is pressed on the display panel, the optical sensor can also receive the image light with fake fingerprint information, thus causing information security problems. Therefore, how to effectively determine whether the fingerprint information is from a fake finger is one of the most important issues in the field.

Due to the different absorption rate distribution of different materials for different wavelengths of light, there are currently existing methods to identify fake fingers made of counterfeit materials based on the reflection characteristics of color light. In detail, the display panel can be used to illuminate different colored lights towards the object to be sensed, and then the sensing results corresponding to different colored lights can be used to determine whether the object to be sensed is a fake finger. However, in the process of manufacturing and assembling the display panel and the optical sensor of the fingerprint sensor device, there are often manufacturing tolerances, and these manufacturing tolerances will adversely affect the accuracy of identifying the fake finger. For example, in the case of a self-luminous display panel, the luminous efficiency of each pixel on different display panels is not the same, so the actual color of the illumination light of different display panels will have a difference. Alternatively, the sensing light amount of the sensing pixel units of the optical sensors in different image sensing devices may be affected by the manufacturing process conditions, the optical characteristics of the optical structure, or other factors. The above-mentioned manufacturing tolerances existing between different fingerprint sensing apparatuses will directly affect the sensing results of the optical sensor, so that the optical sensors in different fingerprint sensing apparatuses can obtain different sensing results for the same object to be sensed, thereby affecting the accuracy of identifying fake fingers.

SUMMARY

The disclosure provides an anti-counterfeiting method and system for under-screen fingerprint identification capable of improving the accuracy of identifying a fake finger.

The disclosure provides an anti-counterfeiting method, applicable to a fingerprint sensing apparatus. A fingerprint sensing apparatus includes a display device and a fingerprint sensor, and the method includes the following steps: capturing a fingerprint sensing image for an object on the display device through the fingerprint sensor; calibrating the fingerprint sensing image by using a color calibration parameter so as to generate a calibrated image; and determining whether the object on the display device is a real finger by using an anti-counterfeiting algorithm and the calibrated image.

The disclosure provides an anti-counterfeiting system, including a fingerprint sensing apparatus. The fingerprint sensing apparatus includes a display device, a fingerprint sensor, and a processor. The fingerprint sensing apparatus is disposed below the display device, and the processor is coupled to the display device and the fingerprint sensor. A fingerprint sensing image is captured for an object on the display device through the fingerprint sensor. The processor may calibrate the fingerprint sensing image by using a color calibration parameter to generate a calibrated image. Whether the object is a real finger is determined by using an anti-counterfeiting algorithm and the calibrated image.

Based on the above, in the embodiments of the disclosure, after the fingerprint sensing image is generated by the fingerprint sensor, the fingerprint sensing image is calibrated by the color calibration parameter. Thereby, the accuracy of identifying fake fingers based on the calibrated image and anti-counterfeiting algorithm can be improved, thus effectively improving the security of fingerprint identification.

In order to make the above-mentioned features and advantages of the disclosure more apparent and understandable, examples of implementation are given below, together with the accompanying diagrams, which are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Wherever possible, the same reference numbers are used in the drawings and the description to refer to the same or like parts.

It should be understood that when a component such as a layer, film, region, or substrate is referred to as being "on" or "connected" to another component, the component may be directly on or connected to the other component, or intervening components may be present. In contrast, when a component is referred to as being "directly on" or "directly connected to" another component, there are no intervening components. As used herein, "connected" may refer to physical and/or electrical connection. Furthermore, "electrically connected" or "coupled" may mean that there are other components between two components.

Figure 1:
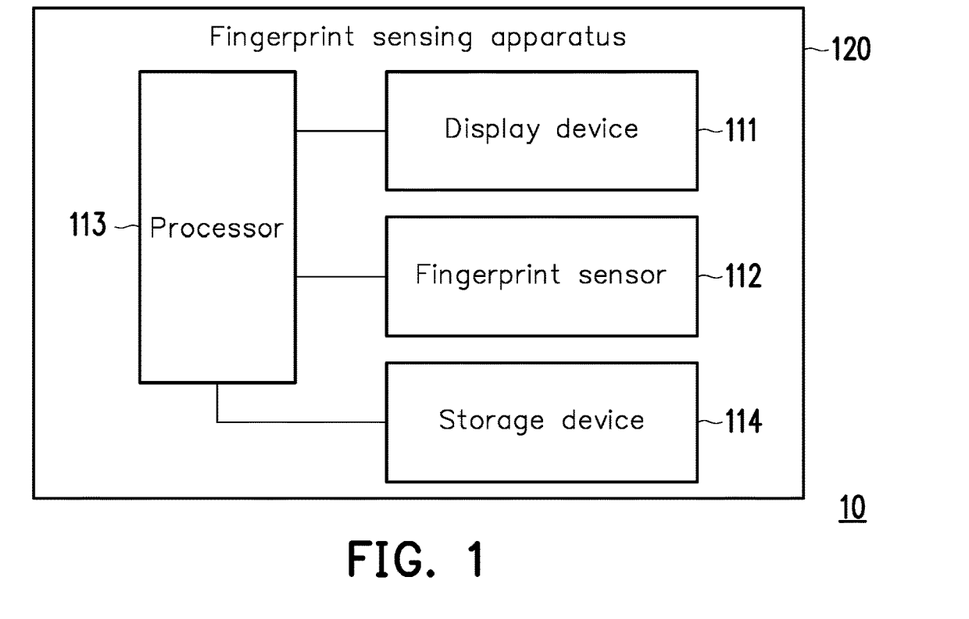
FIG. 1 is a schematic diagram of an anti-counterfeiting system for under-screen fingerprint identification according to an embodiment of the disclosure.

Please refer to FIG. 1. FIG. 1 is a schematic diagram of an anti-counterfeiting system for under-screen fingerprint identification according to an embodiment of the disclosure. An anti-counterfeiting system for under-screen fingerprint identification 10 may include a fingerprint identification device 110. The fingerprint identification device 110 may be a smart phone, a panel, a game console, or other electronic devices with an optical under-screen fingerprint identification function; the disclosure is not limited thereto.

The fingerprint identification device 110 may include a display device 111, a fingerprint sensor 112, a processor 113, and a storage device 114. The processor 113 may be coupled to the storage device 114, the display device 111, and the fingerprint sensor 112. The processor 113 may include a central processing unit (CPU), an application processor (AP), or other programmable general-purpose or special-purpose micro-processor, digital signal processor (DSP), programmable controller, application specific integrated circuit (ASIC), programmable logic device (PLD), or a combination thereof. In other words, the processor 113 may be implemented by one or more integrated circuits (IC), and the disclosure is not limited thereto. For example, the processor 113 may include an application processor and a sensing drive IC.

The storage device 114 is configured to store data, software modules, and code, and may be, for example, any type of fixed or removable random access memory (RAM) or read-only memory (ROM), flash memory, hard disk, other similar devices, integrated circuits, or combinations thereof. In one embodiment, the processor 113 may load the program code or module recorded in the storage device 114 to execute the anti-counterfeiting method for under-screen fingerprint identification proposed by the present embodiment of the disclosure.

The fingerprint sensor 112 may include a sensing pixel array composed of multiple sensing pixels, each of the sensing pixels including at least one photodiode for photoelectric conversion. The fingerprint sensor 112 may be, for example, a thin film transistor (TFT) sensor or other similar components. The fingerprint sensor 112 may also include related circuits connected to the aforementioned sensing pixel array. In an embodiment, the fingerprint sensor 110 may also include other optical components, such as lenses, collimators, filters, and the like, disposed above the sensing pixel array; the disclosure is not limited thereto. Further, the present embodiment takes one fingerprint sensor 112 as an example for illustration, but the disclosure does not limit the number of fingerprint sensors.

The display device 111 may provide illumination light. The display device 111 may be implemented as an organic light-emitting diode (OLED) display, an active matrix organic light emitting diodes (AMOLED) display, or a liquid crystal display; the disclosure is not limited thereto. Specifically, when the display medium of the display device 111 is a non-self-luminous display medium (for example, liquid crystal), the display device 111 needs a backlight module to provide illuminating light for fingerprint sensing. When the display medium of the display device 111 is a self-luminous display medium (for example, OLED), the display device 111 does not need a backlight module to provide illuminating light for fingerprint sensing.

Figure 2:
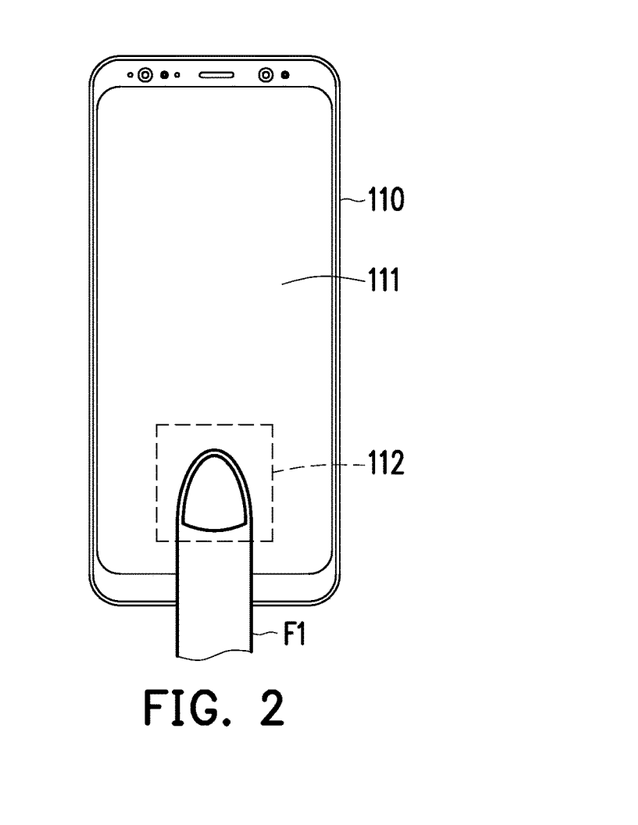
FIG. 2 is a schematic diagram of an optical fingerprint sensing apparatus according to an embodiment of the disclosure.

Please refer to FIG. 2, which is a schematic diagram of an optical fingerprint sensing apparatus according to an embodiment of the disclosure. The fingerprint sensing apparatus 100 provides an under-screen fingerprint identification function. A user may press a finger F1 against a glass cover above the display device 111, such that the fingerprint sensor 112 below the glass cover may obtain a fingerprint image. In detail, during fingerprint sensing, the user places the finger F1 above the display device 111, the display device 111 emits illumination light to the finger, and reflected light generated by the reflection of the finger F1 is transmitted to the fingerprint sensor 112 for fingerprint sensing. The disclosure does not limit the integration mode of the display device 111 and the fingerprint sensor 112. For example, in one embodiment, the fingerprint sensor 112 may be disposed below the display device 111. Alternatively, in one embodiment, the fingerprint sensor 112 may be embedded in the display device 111.

In one embodiment, in order to determine whether a test object on the display device 111 is a real finger or a fake finger, the display device 111 may emit different colored illumination lights towards the test object at different times or at the same time, such that the fingerprint sensor 112 can obtain color sensing values corresponding to different colored illumination lights. For example, the display device 111 may emit red, green, and blue illuminating lights toward the test object, and the reflected lights generated by the reflection of the test object are transmitted to the fingerprint sensor 112, such that the fingerprint sensor 112 can obtain the color sensing values corresponding to different colored illumination lights. Based on different absorption rates of different materials for different colored illumination lights, the processor 113 may use the color sensing values corresponding to different colored illumination lights as input data to an anti-counterfeiting algorithm, so as to determine whether or not the test object on the display device 111 is a real finger based on the anti-counterfeiting algorithm.

In one embodiment, the anti-counterfeiting algorithm includes a machine learning model or a statistical model, which may determine whether the test object on the display device 111 is a real finger or a fake finger based on the input data. In one embodiment, the anti-counterfeiting algorithm includes a classification model that may directly identify what kind of counterfeit material is on the display device 111.

Note that the anti-counterfeiting algorithm is usually built based on training or statistics of the color sensing values generated by one or a few fingerprint sensors. The accuracy of the anti-counterfeiting algorithm will be put to a considerable test in real-life scenarios where there are manufacturing tolerances between different fingerprint sensing apparatuses. Accordingly, in one embodiment, after the fingerprint sensor 112 obtains the color sensing values corresponding to different colored illumination lights, the processor 113 may calibrate the color sensing values by using a color calibration parameter. Then, the processor 113 uses the calibrated color sensing values as the input data of the anti-counterfeiting algorithm to accurately determine whether the test object on the display device 111 is a real finger or a fake finger. In one embodiment, when the display device 111 simultaneously emits different colored illumination lights to the test object, the fingerprint sensing image generated by the fingerprint sensor 112 includes the color sensing values corresponding to different colored illumination lights. The processor 113 may calibrate the fingerprint sensing image by using the color calibration parameter to generate a calibrated image. Then, the processor 113 can determine whether the test object is a real finger based on the anti-counterfeiting algorithm and the multiple color sensing values in the calibrated image.

Figure 3:
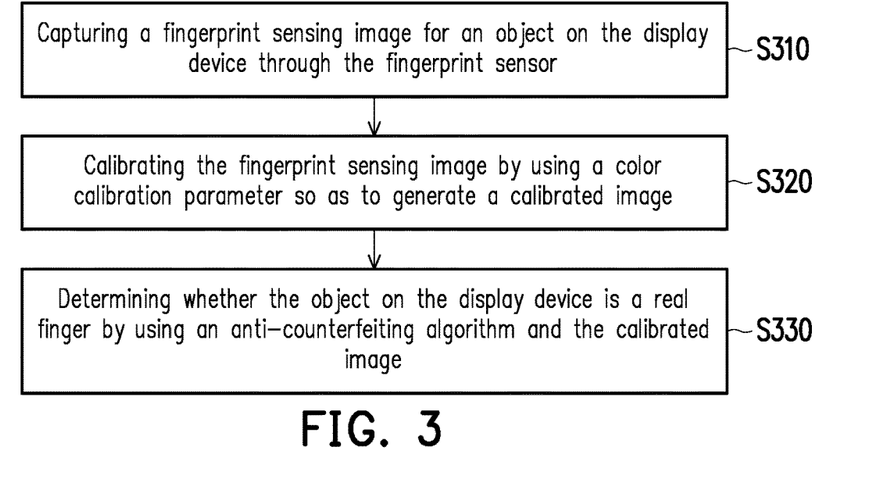
FIG. 3 is a flowchart of an anti-counterfeiting method for under-screen fingerprint identification according to an embodiment of the disclosure.

FIG. 3 is a flowchart of an anti-counterfeiting method for under-screen fingerprint identification according to an embodiment of the disclosure. Referring to FIG. 1 and FIG. 3, the method of the present implementation applies to the anti-counterfeiting system for under-screen fingerprint identification 10 in the above embodiments. The following is a detailed description of the implementation method with the components of the anti-counterfeiting system for under-screen fingerprint identification 10.

In step S310, the fingerprint sensing image is captured for an object on the display device 111 through the fingerprint sensor 112. In one embodiment, the display device 111 may provide different colored illumination lights by displaying a specific image. In detail, in the fingerprint sensing area, the display device 111 may display different color blocks, such that the object on the display device 111 may be illuminated with different colored illumination lights. The object on the display device 111 reflects different colored illumination lights, such that one fingerprint sensing image may be generated by the fingerprint sensor 112. It may be seen that, corresponding to a specific color image displayed by the display device 111, the fingerprint sensing image includes the color sensing values corresponding to different colored illumination lights.

Next, in step S320, the processor 113 may calibrate the fingerprint sensing image by using the color calibration parameter to generate a calibrated image. The color calibration parameter is recorded in the storage device 114. In one embodiment, the color calibration parameter includes a color calibration matrix, which may be stored in a non-volatile memory of the fingerprint sensing apparatus 110, for example. The processor 113 may calibrate the color sensing values of the fingerprint sensing image corresponding to different colored illumination lights through the color calibration parameter, thereby generating the calibrated image.

Figure 4:
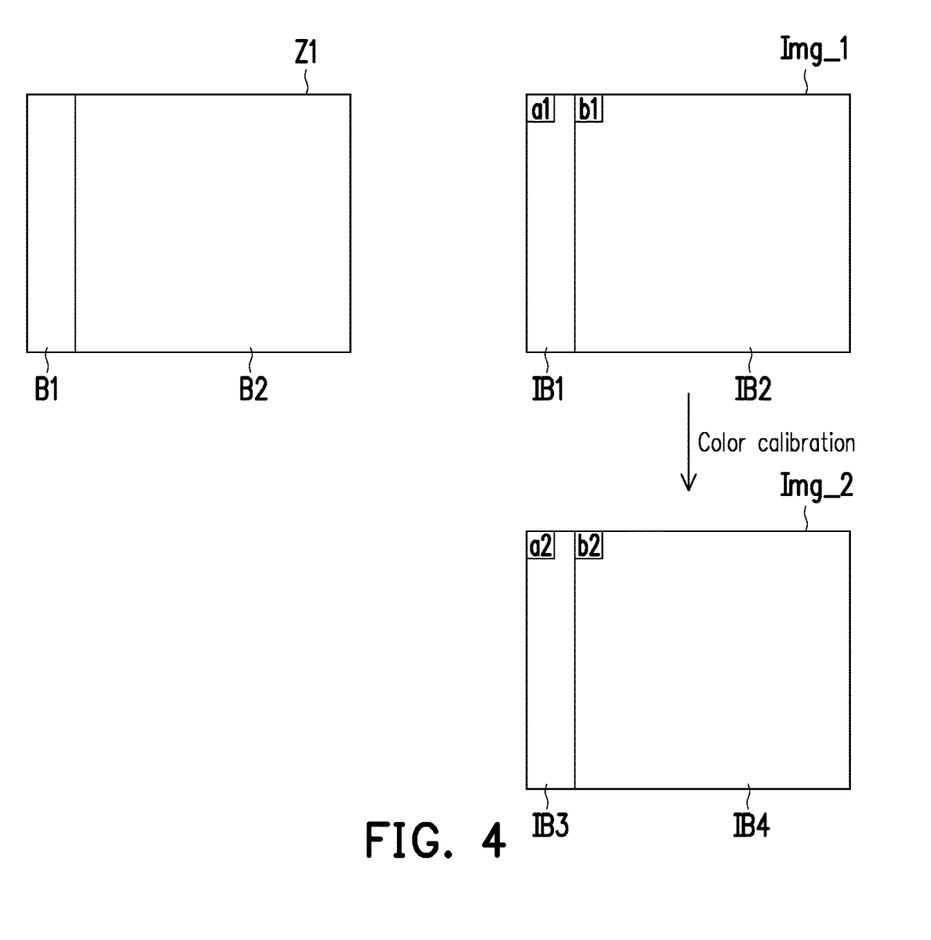
FIG. 4 is a schematic diagram of obtaining a calibrated image according to an embodiment of the disclosure.

For example, FIG. 4 is a schematic diagram of obtaining a calibrated image according to an embodiment of the disclosure. Referring to FIG. 4, it is assumed that the display device 111 may emit a specific color light in a local area of a fingerprint sensing area Z1 and display an color block B1, and emits white light different from the specific color light in another local area of the fingerprint sensing area Z1 and display an color block B2. Under such condition, after performing the fingerprint sensing, the fingerprint sensor 112 may obtain an fingerprint sensing image Img_1, and the fingerprint sensing image Img_1 includes an image block IB1 corresponding to a specific color light and an image block IB2 corresponding to the white light. The image block IB1 is composed of the color sensing value corresponding to a specific color light, and the image block IB2 is composed of the color sensing value corresponding to the white light. Then, the processor 113 may calibrate the color sensing values in the fingerprint sensing image Img_1 by using the color calibration parameter to generate a calibrated image Img_2 including an image block IB3 and an image block IB4 respectively corresponding to the specific color light and the white light. For example, the processor 113 may calibrate a color sensing value a1 in the image block IB1 to a color sensing value a2 in image block IB3 according to the color calibration parameter, and calibrate a color sensing value b1 in the image block IB2 to a color sensing value b2 in the image block IB4 according to the color calibration parameter. However, FIG. 4 is only used to illustrate the principle of the disclosure, and is not used to limit the disclosure. The specific image displayed by the display device 111 in the fingerprint sensing area Z1 may be designed according to actual needs.

In step S330, the processor 113 determines whether the object on the display device 111 is a real finger by using the anti-counterfeiting algorithm and the calibrated image. In one embodiment, the anti-counterfeiting algorithm includes a classification model, and the calibrated image is input to the classification model. The classification model is configured to classify the calibrated image into a category corresponding to the real finger or at least one category corresponding to at least one counterfeit material. The classification model may be, for example, a neural network model, a support vector machine model, or a k-means clustering model, and the like; the disclosure is not limited thereto. In one embodiment, the processor 113 may determine whether the object on the display device 111 is a real finger or a fake finger based on part of or the entire calibrated image.

In one embodiment, the color calibration parameter that may be used by the processor 113 is generated based on a calibration procedure, and the color calibration parameter may be stored in the storage device 114 of the fingerprint sensing apparatus 110. Examples will be listed below for illustration.

Figure 5:
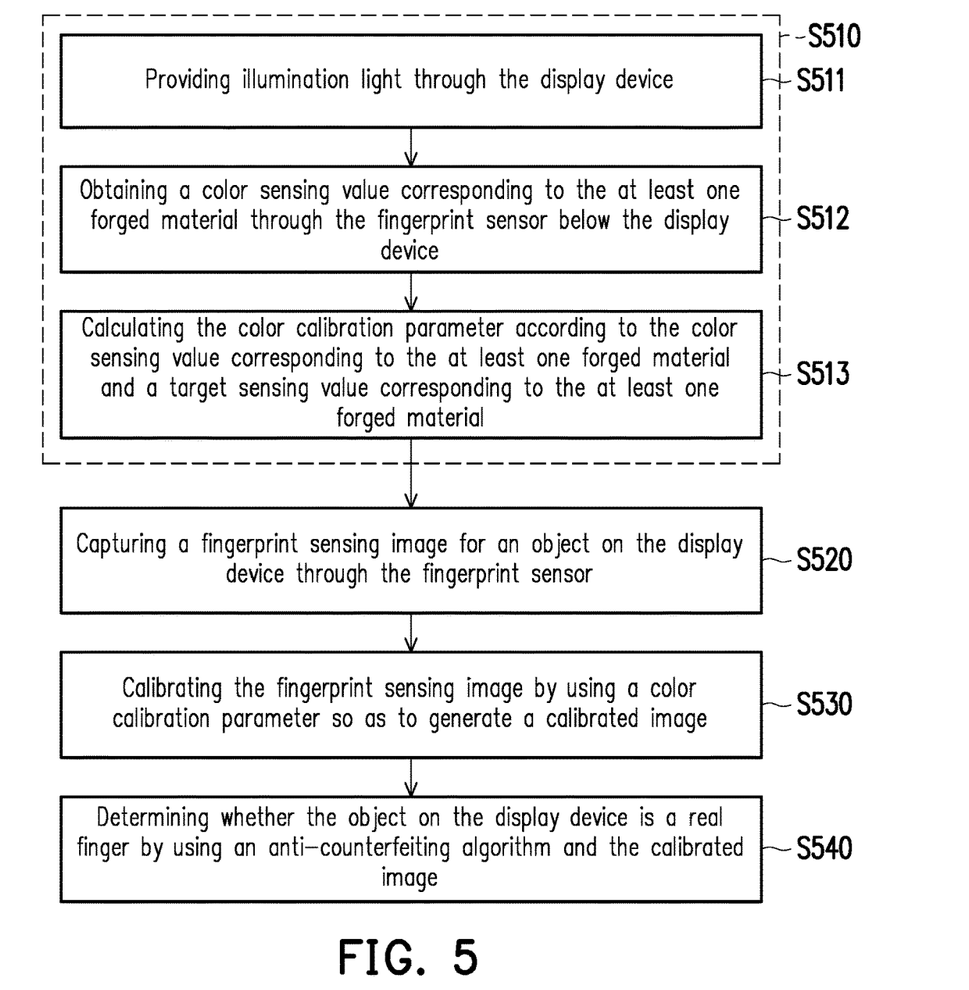
FIG. 5 is a flowchart of an anti-counterfeiting method for under-screen fingerprint identification according to an embodiment of the disclosure.

FIG. 5 is a flowchart of an anti-counterfeiting method for under-screen fingerprint identification according to an embodiment of the disclosure. Referring to FIG. 1 and FIG. 5, the method of the present implementation applies to the anti-counterfeiting system for under-screen fingerprint identification 10 in the above embodiments. The following is a detailed description of the implementation method with the components of the anti-counterfeiting system for under-screen fingerprint identification 10.

In step S510, the processor 113 may execute the calibration procedure through the display device 111 and the fingerprint sensor 112 by using at least one counterfeit material, so as to obtain the color calibration parameter. In one embodiment, a calibration software program may be loaded into the storage device 114 in the fingerprint sensing apparatus 110, and the processor 113 may execute the calibration software program to generate the color calibration parameter, and record the color calibration parameter in the storage device 114 of the fingerprint sensing apparatus 110. In the present embodiment, the color calibration parameter may include a color calibration matrix. The counterfeit material may be, for example, silicone, agar, photocopy paper, matte paper, and the like. The number and types of the at least one counterfeit material are not limited in the disclosure, and may be configured according to actual needs.

Step S510 may be divided into sub-steps S511 to S513 and implemented. In step S511, the illumination light is provided through the display device 111. At least one counterfeit material is disposed on the display device 111. In one embodiment, the display device 111 may control all pixels in the fingerprint sensing area to display the same color, so as to sequentially emit different single color light at different time points. Alternatively, in one embodiment, the display device 111 may control the pixels in the fingerprint sensing area to display different colors at the same time, so as to emit different colored illumination lights to display multiple color blocks corresponding to multiple color illumination lights.

In step S512, the processor 113 obtains the color sensing value corresponding to the at least one counterfeit material through the fingerprint sensor 112 below the display device 111. In step S513, the processor 113 calculates the color calibration parameter according to the color sensing value corresponding to at least one counterfeit material and the target sensing value corresponding to the at least one counterfeit material. In one embodiment, the at least one counterfeit material includes a first counterfeit material and a second counterfeit material. The color sensing value corresponding to the at least one counterfeit material includes a first color sensing value corresponding to the first counterfeit material and a second color sensing value corresponding to the second counterfeit material. The target sensing value corresponding to the at least one counterfeit material includes a first target sensing value corresponding to the first counterfeit material and a second target sensing value corresponding to the second counterfeit material, and the color calibration parameter is obtained by calculating the first color sensing value, the second color sensing value, the first target sensing value, and the second target sensing value.

Figure 6:
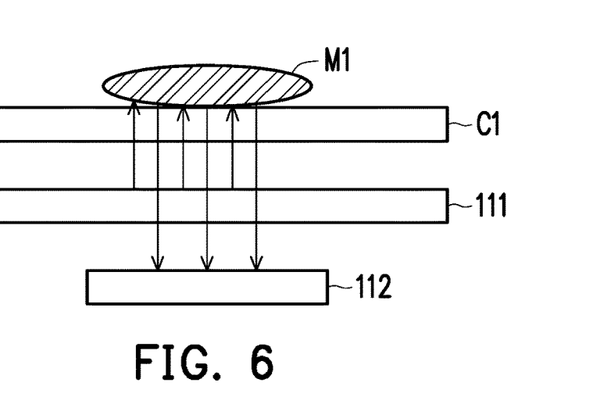
FIG. 6 is a schematic diagram of executing a calibration procedure using counterfeit material according to an embodiment of the disclosure.

FIG. 6 is a schematic diagram of executing a calibration procedure using counterfeit material according to an embodiment of the disclosure. Referring to FIG. 6, an operator may place a counterfeit material M1 on a glass cover C1 above the display device 111. The display device 111 may provide different colored illumination lights at different times or at the same time. The counterfeit material M1 reflects different colored illumination lights, and the fingerprint sensor 112 may obtain the color sensing values corresponding to the counterfeit material M1, and the color sensing values are generated based on the sensing of the different colored illumination lights. Thus, the processor 113 may calculate the color calibration parameter according to the color sensing values corresponding to the at least one counterfeit material M1 and the target sensing values corresponding to the at least one counterfeit material M1. The above-mentioned target sensing values may be generated through experiments and statistics, and the color sensing values corresponding to the counterfeit material M1 and the target sensing values corresponding to the counterfeit material M1 reflect the manufacturing tolerance. In addition, in one embodiment, the processor 113 may also calculate the color calibration parameter based on the color sensing values and the target sensing values corresponding to the counterfeit material M1 and the color sensing values and the target sensing values corresponding to another counterfeit material. In other words, the processor 113 may determine the color calibration parameter according to the color sensing values and the target sensing values of one or more counterfeit materials.

For example, Table 1 shows the color sensing values of four counterfeit materials according to an embodiment of the disclosure. As shown in Table 1, the processor 113 may obtain the color sensing values of multiple counterfeit materials. The color sensing values of each counterfeit material include the color sensing values corresponding to multiple color channels, which include channels RGB.

TABLE 1

| Counterfeit material | Color sensing value of Channel R | Color sensing value of Channel G | Color sensing value of Channel B |
|---|---|---|---|
| Material A | 152 | 198 | 201 |
| Material B | 192 | 175 | 154 |
| Material C | 254 | 222 | 234 |
| Material D | 200 | 178 | 202 |

The display device 111 may obtain a color sensing value '152' of channel R through the fingerprint sensor 112 by emitting red light on a 'material A'. The display device 111 may obtain a color sensing value '198' of channel G through the fingerprint sensor 112 by emitting green light on the 'material A'. The display device 111 may obtain a color sensing value '201' of channel B through the fingerprint sensor 112 by emitting blue light on the 'material A'; and so on.

For example, table 2 shows the target sensing values of four counterfeit materials according to an embodiment of the disclosure. As shown in Table 2, the processor 113 may obtain the target sensing values of multiple counterfeit materials. The target sensing values of each counterfeit material include the target sensing values corresponding to multiple color channels, which include channels RGB. The target sensing values corresponding to multiple color channels may be generated based on testing and data statistics.

TABLE 2

| Counterfeit material | Target sensing value Of Channel R | Target sensing value Of Channel G | Target sensing value Of Channel B |
|---|---|---|---|
| Material A | 172 | 188 | 210 |
| Material B | 162 | 142 | 172 |
| Material C | 242 | 235 | 244 |
| Material D | 210 | 198 | 222 |

Then, the processor 113 may determine the color correction parameters a11, a12, a13, a21, a22, a23, a31, a32, and a33 in the color calibration matrix according to the following matrix multiplication formula (1), and record the color calibration matrix in the storage device 114.

$$\begin{bmatrix} R_{target} \\ G_{target} \\ B_{target} \end{bmatrix} = \begin{bmatrix} a11 & a21 & a31 \\ a12 & a22 & a32 \\ a13 & a23 & a33 \end{bmatrix} \begin{bmatrix} R_{measure} \\ G_{measure} \\ B_{measure} \end{bmatrix} \quad \text{Formula (1)}$$

$R_{target}$, $G_{target}$, and $B_{target}$ represent target sensing values corresponding to the channels RGB, and $R_{measure}$, $G_{measure}$, and $B_{measure}$ represent color sensing values corresponding to the channels RGB. In the present example, the processor 113 may substitute the values in Table 1 and Table 2 into formula (1) so as to obtain each matrix element in the color calibration matrix.

Moreover, in one embodiment, the display device 111 may control all pixels in the fingerprint sensing area to display the same color, so as to sequentially emit different single color light at different time points. Alternatively, in one embodiment, the display device 111 may control the pixels in the fingerprint sensing area to display different colors at the same time, so as to emit different colored illumination lights to display multiple color blocks corresponding to multiple color illumination lights. In other words, in one embodiment, the display device 111 provides different colored illumination lights by displaying a specific image. The specific image includes multiple color blocks respectively corresponding to multiple colored illumination lights. In one embodiment, the multiple counterfeit materials may be disposed on the specific image displayed by the display device 111 at the same time, and each of the counterfeit materials will be respectively located above some of the color blocks. In this way, the processor 130 may perform one exposure imaging through the fingerprint sensor 111 and obtain the color sensing values corresponding to multiple counterfeit materials, thereby improving the efficiency of the calibration process.

Figure 7:
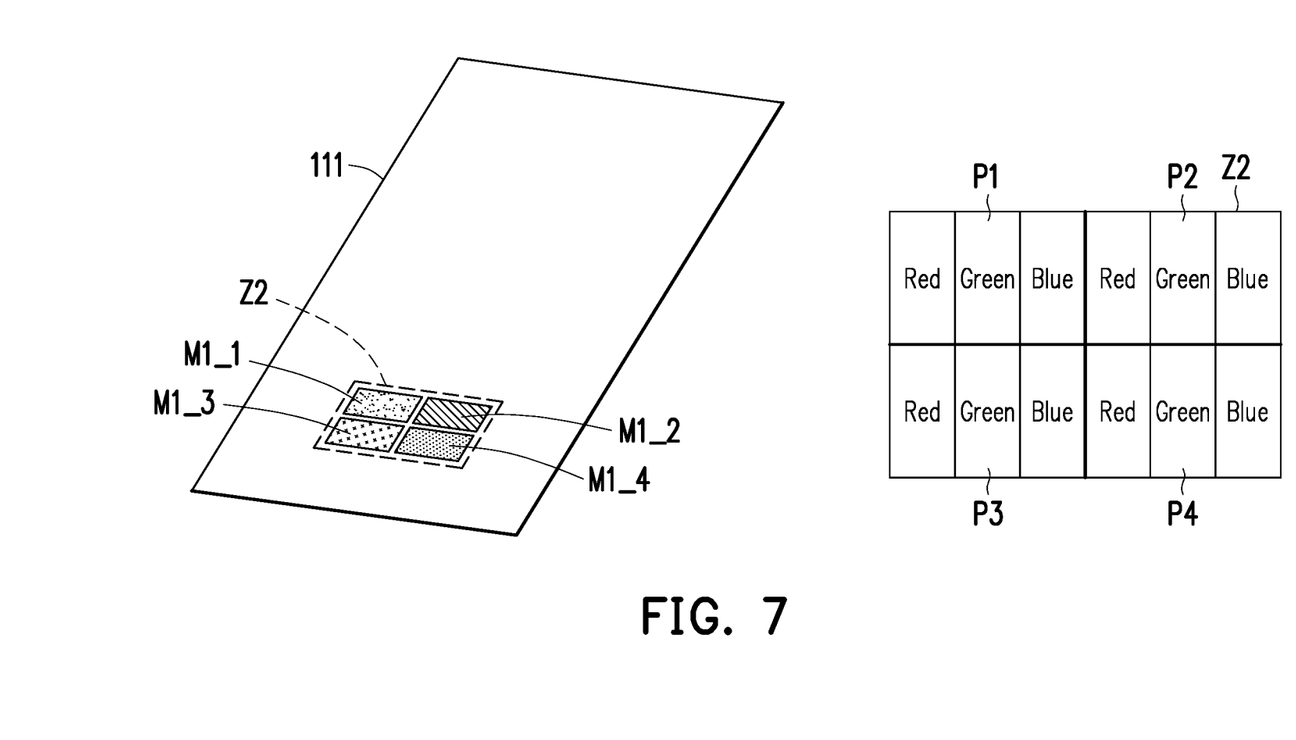
FIG. 7 is a schematic diagram of a display device displaying a specific image and executing a calibration procedure according to an embodiment of the disclosure.

FIG. 7 is a schematic diagram of a display device displaying a specific image and executing a calibration procedure according to an embodiment of the disclosure. The operator may simultaneously place counterfeit materials M1_1 to M1_4 above the specific image displayed in the fingerprint sensing area Z2 of the display device 111. The display device 111 provides different colored illumination lights by displaying a specific image in the fingerprint sensing area Z2. For the four counterfeit materials M1_1 to M1_4, the specific image includes four identical sub-images P1 to P4. Each of the sub-images P1 to P4 includes multiple color blocks corresponding to multiple color illumination lights. For example, the sub-image P1 may include three color blocks corresponding to red illuminating light, green illuminating light, and blue illuminating light. In the present example, the specific image includes 12 color blocks, and the counterfeit materials M1_1 to M1_4 are each located above the three color blocks of the sub-image P1 to P4. In this way, the fingerprint sensor 122 may obtain the multiple color sensing values corresponding to the counterfeit materials M1_1 to M1_4 after one exposure imaging. However, FIG. 7 is only used as an example to illustrate the principle of the embodiments of the disclosure, and is not used to limit the disclosure.

In step S520, the fingerprint sensing image is captured for the object on the display device 111 through the fingerprint sensor 112. In step S530, the processor 113 calibrates the fingerprint sensing image by using the color calibration parameter to generate a calibrated image. In step S540, the processor 113 determines whether the object on the display device 111 is a real finger by using the anti-counterfeiting algorithm and the calibrated image. The implementation contents of step S520 to step S540 are similar to those of the previous steps S310 to step S330, and will not be repeated here.

In summary, in the embodiments of the disclosure, the accuracy of the anti-counterfeiting algorithm can be improved by eliminating the undesirable effects of manufacturing tolerances of the fingerprint sensing apparatus on the accuracy of the anti-counterfeiting algorithm. Thus, the security of fingerprint identification can be significantly enhanced by the embodiments of the disclosure. In addition, by determining the specific display image through the display device corresponding to multiple counterfeit materials, the efficiency of the calibration process can be greatly improved by the embodiments of the disclosure.

Finally, it should be noted that the embodiments of the disclosure are intended only to illustrate the technical scheme of the disclosure and not to limit it. Notwithstanding the detailed description of the disclosure with reference to the preceding embodiments, one of ordinary skill in the art should understand that he or she may still modify the technical scheme of the preceding embodiments or make equivalent substitutions of some or all of the technical features thereof, and that such modifications or substitutions do not take the nature of the corresponding technical scheme out of the scope of the technical scheme of the preceding embodiments.

What is claimed is:

1. An anti-counterfeiting method for under-screen fingerprint identification, applicable to a fingerprint sensing apparatus, the fingerprint sensing apparatus comprising a display device and a fingerprint sensor, and the method comprising:
   emitting different colored illumination lights towards an object through the display device and capturing a fingerprint sensing image for the object on the display device through the fingerprint sensor;
   calibrating color sensing values corresponding to the different colored illumination lights of the fingerprint sensing image by using a color calibration parameter so as to generate a calibrated image; and
   determining whether the object on the display device is a real finger by using an anti-counterfeiting algorithm and the calibrated image, wherein input data to the anti-counterfeiting algorithm comprises the calibrated color sensing values corresponding to the different colored illumination lights,
   wherein before a step of capturing the fingerprint sensing image for the object on the display device through the fingerprint sensor, the method further comprises:
   executing a calibration procedure through the display device and the fingerprint sensor by using at least one counterfeit material so as to obtain the color calibration parameter, wherein the color calibration parameter comprises a color calibration matrix.

2. The anti-counterfeiting method for under-screen fingerprint identification of claim 1, wherein a step of obtaining the calibration parameter by executing the calibration procedure through the display device and the fingerprint sensor comprises:
   providing illumination light through the display device, wherein the at least one counterfeit material is disposed on the display device;
   obtaining a color sensing value corresponding to the at least one counterfeit material through the fingerprint sensor below the display device; and
   calculating the color calibration parameter according to the color sensing value corresponding to the at least one counterfeit material and a target sensing value corresponding to the at least one counterfeit material.

3. The anti-counterfeiting method for under-screen fingerprint identification of claim 2, wherein a step of providing the illuminating light through the display device comprises:
   providing the illuminating light by displaying a specific image through the display device, wherein the specific image comprises a plurality of color blocks respectively corresponding to a plurality of colored illuminating lights, and each of the at least one counterfeit material is located above some of the color blocks.

4. The anti-counterfeiting method for under-screen fingerprint identification of claim 2, wherein the at least one counterfeit material comprises a first counterfeit material and a second counterfeit material; the color sensing value corresponding to the at least one counterfeit material comprises a first color sensing value corresponding to the first counterfeit material and a second color sensing value corresponding to the second counterfeit material; the target sensing value corresponding to the at least one counterfeit material comprises a first target sensing value corresponding to the first counterfeit material and a second target sensing value corresponding to the second counterfeit material; and the color calibration parameter is obtained by calculating the first color sensing value, the second color sensing value, the first target sensing value, and the second target sensing value.

5. The anti-counterfeiting method for under-screen fingerprint identification of claim 2, wherein the color sensing value corresponding to the at least one counterfeit material comprises a first color sensing value, a second color sensing value, and a third color sensing value that are corresponding to channels RGB; and the target sensing value comprises a first target sensing value, a second target sensing value, and a third target sensing value that are corresponding to the channels RGB.

6. The anti-counterfeiting method for under-screen fingerprint identification of claim 1, wherein the anti-counterfeiting algorithm comprises a classification model, the calibrated image is input to the classification model, and the classification model is configured to classify the calibrated image as a category corresponding to the real finger or at least one category corresponding to at least one counterfeit material.

7. An anti-counterfeiting system for under-screen fingerprint identification, comprising:
a fingerprint sensing apparatus, comprising:
a display device, emitting different colored illumination lights towards an object;
a fingerprint sensor; and
a processor, coupled to the display device and the fingerprint sensor,
wherein the fingerprint sensor captures a fingerprint sensing image for the object on the display device, the processor calibrates color sensing values corresponding to the different colored illumination lights of the fingerprint sensing image by using a color calibration parameter so as to generate a calibrated image, and the processor determines whether the object on the display device is a real finger by using an anti-counterfeiting algorithm and the calibrated image, wherein input data to the anti-counterfeiting algorithm comprises the calibrated color sensing values corresponding to the different colored illumination lights,
wherein the processor executes a calibration procedure through the display device and the fingerprint sensor by using at least one counterfeit material, so as to obtain the color calibration parameter, wherein the color calibration parameters comprise a color calibration matrix.

8. The anti-counterfeiting system for under-screen fingerprint identification of claim 7, wherein the display device provides illumination light, the at least one counterfeit material is disposed above the display device, the processor obtains a color sensing value corresponding to the at least one counterfeit material through the fingerprint sensor below the display device, and obtains the color calibration parameter by calculating based on the color sensing value corresponding to the at least one counterfeit material and a target corresponding to the at least one counterfeit material.

9. The anti-counterfeiting system for under-screen fingerprint identification of claim 8, wherein the display device provides the illuminating light by displaying a specific image, the specific image comprises a plurality of color blocks respectively corresponding to a plurality of colored illuminating lights, and each of the at least one counterfeit material is located above some of the color blocks.

10. The anti-counterfeiting system for under-screen fingerprint identification of claim 8, wherein the at least one counterfeit material comprises a first counterfeit material and a second counterfeit material; the color sensing value corresponding to the at least one counterfeit material comprises a first color sensing value corresponding to the first counterfeit material and a second color sensing value corresponding to the second counterfeit material; the target sensing value corresponding to the at least one counterfeit material comprises a first target sensing value corresponding to the first counterfeit material and a second target sensing value corresponding to the second counterfeit material; and the color calibration parameter is obtained by calculating the first color sensing value, the second color sensing value, the first target sensing value, and the second target sensing value.

11. The anti-counterfeiting system for under-screen fingerprint identification of claim 8, wherein the color sensing value corresponding to the at least one counterfeit material comprises a first color sensing value, a second color sensing value, and a third color sensing value that are corresponding to channels RGB, and the target sensing value comprises a first target sensing value, a second target sensing value, and a third target sensing value that are corresponding to the channels RGB.

12. The anti-counterfeiting system for under-screen fingerprint identification of claim 7, wherein the anti-counterfeiting algorithm comprises a classification model, the calibrated image is input to the classification model, and the classification model is configured to classify the calibrated image as a category corresponding to the real finger or at least one category corresponding to at least one counterfeit material.

* * * * *